United States Patent Office 3,595,601
Patented July 27, 1971

3,595,601
DYE ADDITIVE FOR CELLULOSE ESTERS
Charles L. Smart, Millington, N.J., assignor to
Celanese Corporation, New York, N.Y.
Continuation-in-part of application Ser. No. 526,005, Dec.
28, 1965, now Patent No. 3,454,349, dated July 8,
1969. This application Mar. 4, 1968, Ser. No. 710,354
The portion of the term of the patent subsequent to
July 8, 1986, has been disclaimed
Int. Cl. D06p 3/42
U.S. Cl. 8—4                                                   15 Claims

ABSTRACT OF THE DISCLOSURE

Shaped articles of cellulose esters having improved dyeability and printability comprising a cellulose ester having incorporated therein a minor proportion of a vinyl acetate polymer having a molecular weight below about 15,000 and a process for producing said shaped articles.

---

Figure 1:
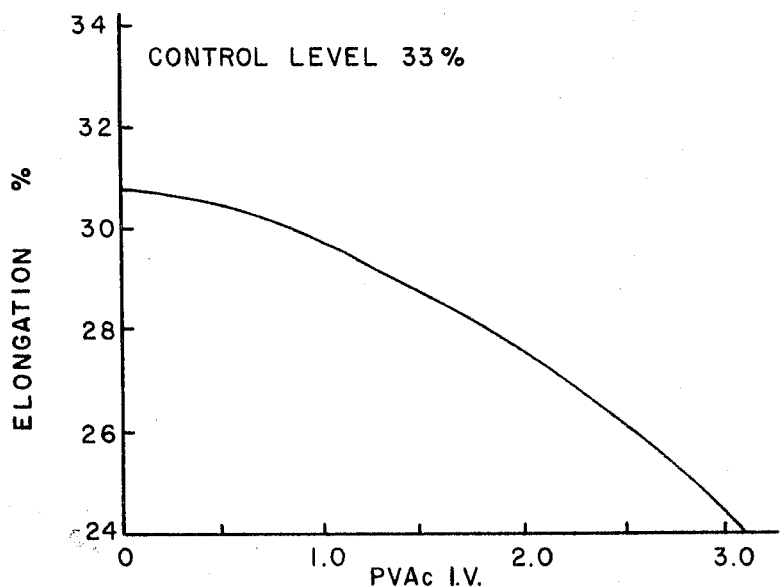

This application is a continuation-in-part of U.S. application Ser. No. 526,005, filed Dec. 28, 1965, now U.S. Pat. No. 3,454,349, granted July 8, 1969.

BACKGROUND OF THE INVENTION

This invention relates to the production of shaped articles of certain cellulose esters having improved properties.

Cellulose esters of low hydroxyl content, e.g., cellulose triacetate, possess certain desirable properties which make them useful when formed into shaped articles such as filamentary materials and films, but they have been found to be relatively difficult to dye or print. For example, it is difficult to dye filamentary materials formed from these cellulose esters by means of the standard dyeing procedures which may be applied to more easily dyed materials such as wool, cotton and cellulose secondary acetate. This is especially true when the so-called "disperse" dyes which are ordinarily applied to cellulose secondary acetate are being used.

It has been found that forming a cellulose ester of low hydroxyl content, e.g., cellulose triacetate, into shaped articles, e.g., filamentary materials or films, in the presence of a preformed low molecular weight polymer of vinyl acetate, has the effect of improving the dyeability and printability of the cellulose ester. Preferably, the cellulose ester is formed into filaments or films by means of dry extrusion techniques, e.g., dry spinning, in which case the vinyl acetate polymer may be incorporated into the spinning solution. When the filamentary material is prepared by means of this technique, the additive is present substantially throughout the cross-sections of the individual filament. In the ideal case, the mixture is homogeneous, but it may be varied to produce special effects for use in novelty yarns.

It is preferred that a preformed vinyl acetate polymer be added to the cellulose ester, rather than forming such polymer by polymerizing vinyl acetate in the presence of the cellulose ester. The reason for this is that if vinyl acetate is polymerized in the presence of a cellulose ester, such as cellulose triacetate, the resulting mass is apparently a graft or block polymer of the cellulose ester and vinyl acetate rather than the physical mixture of polymers contemplated by the present invention, and such graft or block polymer does not have the properties of the original cellulose ester. For example, when vinyl acetate is polymerized in the presence of cellulose triacetate, the resulting polymer is substantially soluble in acetone, whereas the cellulose triacetate in a mixture formed by adding preformed polyvinyl acetate to cellulose triacetate remains substantially insoluble in acetone.

As disclosed in U.S. application Ser. No. 526,005, filed Dec. 28, 1965, by Charles L. Smart, now U.S. Pat. 3,454,349, assigned to the same assignee as this application, it has previously been found that the use of a preformed vinyl acetate polymer has the effect of improving the dyeability of cellulosic articles. It has now been found that the deep dyeing and printing properties of such articles are substantially improved by the utilization of the low molecular weight polyvinyl acetate of this invention. Further, fibers prepared utilizing this invention evidence a high degree of washfastness and lightfastness.

Accordingly, this invention has as an object the provision of deep dyeing and printing cellulosic-shaped articles with the concomitant advantage of unusual fastness. A further object is to provide a procedure for obtaining deep dyeing or printing of cellulose triacetate filamentary materials or films of unusual fastness without recourse to severe processing conditions. Other objects will appear hereinafter.

SUMMARY OF THE INVENTION

The above-mentioned objects are accomplished by the process of the present invention wherein the low molecular weight polyvinyl acetate utilized with the cellulosic materials is polymerized by bringing it in contact with a conventional polymerization catalyst in a specific liquid medium which is a solvent for the monomer and the polymer and under preferred reaction conditions, i.e., superatmospheric pressure, etc. This process yields a shaped article comprising a major proportion of a cellulose ester of a lower aliphatic carboxylic acid, e.g., the cellulose esters of formic acid, acetic acid, propionic acid, butyric acid and the like, containing fewer than about 0.29, preferably fewer than about 0.12, free hydroxyl groups per anhydroglucose unit in the cellulose molecule and containing throughout its cross-section and physically mixed with the cellulose ester a minor proportion of a vinyl acetate polymer having a molecular weight of from about 500 to about 15,000. Particularly important cellulose esters within the scope of this invention are those containing more than 59 percent and preferably more than 61 percent of acetyl groups calculated as combined acetic acid.

The process of this invention comprises dissolving from about 51 percent to about 99 percent of the cellulose ester of a lower aliphatic carboxylic acid and from about 1 percent to about 49 percent, preferably from about 5 percent to about 20 percent, most preferably from about 7 percent to about 10 percent, of the vinyl acetate polymer in a volatile solvent, for example, dimethylformamide, dimethylacetamide, a mixture of methylene chloride/methanol and the like, to form a solution of from about 15 percent to about 35 percent, preferably from about 20 percent to about 25 percent, total solids, and extruding the solution into an evaporative atmosphere, evaporatively removing the solvent and collecting the shaped article comprising the cellulose ester with a low molecular weight vinyl acetate polymer distributed throughout the cross-section of the shaped article and in physical mixture with the cellulose ester.

Accordingly, the vinyl acetate polymer employed in conjunction with the cellulose ester of this invention is a product having a molecular weight below about 15,000 and preferably from 500 to 1000, and an inherent viscosity below about 0.10 and preferably from about 0.03 to about 0.05. A vinyl acetate polymer of particular preference is one of high linearity, i.e., characterized by a minimum of chain branching. The vinyl acetate polymer additive contains a major amount, i.e. more than 50 percent by weight of polymerized vinyl acetate, and may be a homopolymer, i.e., polyvinyl acetate or a copolymer of vinyl acetate with a minor amount of a comonomer such as a lower alkyl acrylate or methacrylate, e.g., methyl acrylate or methyl methacrylate, vinyl chloride, vinyl alkyl ethers, vinyl stearate, diethyl maleate, the vinyl sulfonic acid sodium or potassium salt, or the methallyl sulfonic acid sodium or potassium salt, e.g., sodium methallyl sulfonate.

To obtain a polyvinyl acetate which will evidence the desired characteristics, it is preferred that the polymerization of the vinyl acetate be carried out in the presence of a chain terminating agent such as a $C_1$–$C_4$ alkanol, for example, methanol, ethanol, n-propyl alcohol, isopropyl alcohol, N-butyl alcohol, secondary-butyl alcohol or isobutyl alcohol, preferably isopropyl alcohol. As pointed out, it is desirable that the polymerization of the vinyl acetate be interrupted at the desired stage of viscosity, polymer conversion and polymer concentration. The remarkable differences in behavior among the individual vinyl esters, even those which are chemically closely related, are shown by the fact that other vinyl esters, e.g., vinyl propionate or vinyl benzoate, are not operable. Thus, it is preferred to employ a vinyl acetate polymer having the characteristics defined herein.

One preferred characteristic is the molecular weight of the polyvinyl acetate, which is low, preferably below about 15,000, most preferably from about 500 to about 1000. In order to remove the uncertainties attending molecular weight determination of polymers, it is preferable to adopt as a criterion the inherent viscosity in a suitable solvent. Accordingly, it has been found that the polyvinyl acetates suitable for use herein have inherent viscosities below about 0.10 and preferably below about 0.05 in acetone at 25 degrees centigrade and .1% concentration. In accordance with the invention, polyvinyl acetate of this viscosity range is preferably coupled with the previously mentioned condition of having been polymerized in an alkanol of 1 to 4 carbon atoms, most preferably isopropyl alcohol. It has also been found that the polymerization is advantageously carried out under superatmospheric pressure.

The following is a brief description of a preferred method for producing the vinyl acetate polymer utilized in applicant's invention. Vinyl acetate is polymerized in isopropanol in the presence of a polymerization catalyst, for example, free-radical catalysts such as t-butyl peroctoate or di-t-butyl peroxide. The polymerization is preferably carried out at a relatively high temperature, e.g., between 120 degrees and 160 degrees centigrade. The polymerization is then stopped.

The following is a brief description of a preferred method for producing applicant's shaped article of improved dyeability and printability. The vinyl acetate polymer is solutioned, e.g., in 91/9 methylene chloride/ methanol, at concentrations ranging from about 40 percent to about 70 percent, depending upon molecular weight. The vinyl acetate solution is then filtered and added to the spinning dope containing the cellulose ester, e.g., cellulose triacetate. The percentage of vinyl acetate polymer added is based on the cellulose ester, e.g., 10 percent vinyl acetate polymer added to a solution initially 21.9 percent cellulose triacetate, would result in a dope having 23.6 percent total solids and 9.09 percent vinyl acetate polymer based on total solids. The dope is then spun to yield a filamentary material wherein the vinyl acetate polymer is present substantially throughout the cross-sections of the individual filament.

The yarn filament may be tested as it is or woven into fabric. Tests may be conducted for inherent viscosity, tensile properties, light fastness, dyeability, washfastness, dry-cleaning fastness, fastness to perspiration, safe-ironing temperature, abrasion resistance, original whiteness, whiteness retention and response to bleaching. It has been found that the use of a vinyl acetate polymer additive in a cellulose ester such as cellulose triacetate has no significant effect on the washfastness, dry-cleaning fastness, perspiration fastness, whiteness, whiteness retention during heat treatment, response to bleaching or abrasion resistance when compared to regular triacetate.

The safe-ironing temperature of heat-treated vinyl acetate polymer deep-dye tricaetate is substantially equivalent to that for heat-treated regular triacetate. The vinyl acetate polymer deep-dye triacetate can be heat-set at lower temperatures (about 5 to 10 degrees centigrade lower) than regular triacetate. Elongation and tensile properties are comparable to filaments spun without the vinyl acetate polymer additive. Tests indicated that the addition of a vinyl acetate polymer to a cellulose ester, e.g., cellulose triacetate, produced deep dyeability and printability to a substantial extent.

In general, filamentary materials or films of a cellulose ester of low hydroxyl content containing a low molecular weight vinyl acetate polymer, having a molecular weight of from about 500 to about 15,000, have substantially improved printability and dyeability. Improved dyeability is indicated by an increased dyeing rate and a higher rate of practical dye exhaustion as compared with an identically prepared and treated material but containing no low molecular weight vinyl acetate polymer which is dyed with the same dye bath in substantially the same manner. Improved printability is indicated by high dye fixation, high color yield, heavier shades and a marked reduction in the steam autoclaving required to fix the dye.

FIG. 1 illustrates the effect of the molecular weight of the polyvinyl acetate (expressed as Inherent Viscosity) on elongation.

Figure 2:
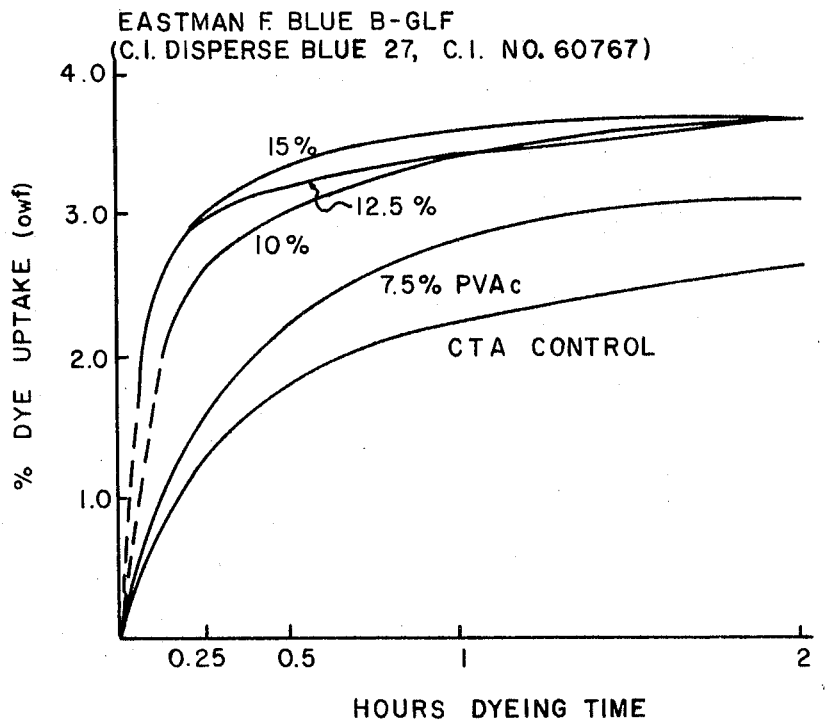
Figure 3:
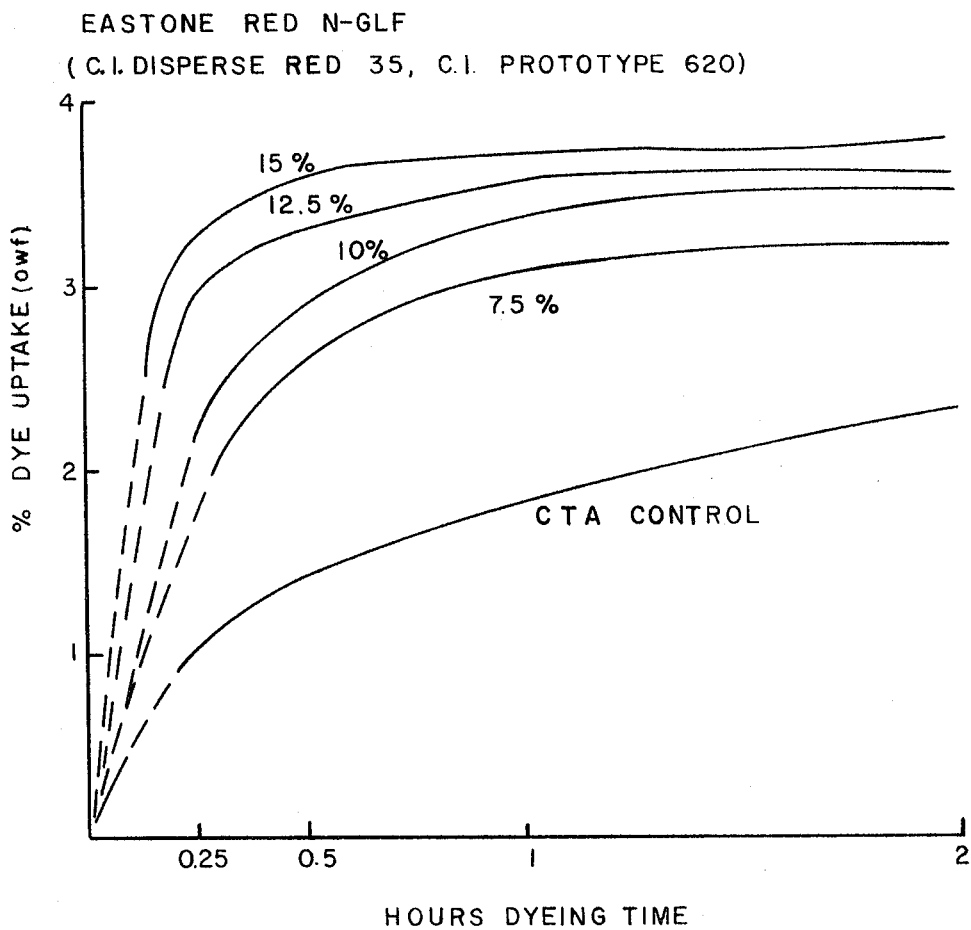

FIGS. 2 and 3 show the effect of the concentration of polyvinyl acetate on the dyeing rates of C.I. Disperse Blue 27 (C.I. No. 60767) and C.I. Disperse Red 35 (C.I. Prototype 620), respectively.

The use of higher molecular weight polyvinyl acetate resins results in a decrease in tensile properties, e.g., elongations as shown in FIG. 1, and somewhat reduced dyeability and printability when compared with low molecular weight material. The concentration of polyvinyl acetate may be as high as about 49 percent, but the dyeability enhancing effect of concentrations much above 15 percent is not proportionally increased, as shown in FIGS. 2 and 3, and there is an accompanying decrease in yarn tensile properties.

The standard dye bath may contain, for example, ½ to 8 percent based on the weight of fabric or fiber sample (OWF) of a disperse dye of the class well known in the art to be suitable for the dyeing of cellulose secondary acetate, such as Interchemical Acetate Blue GSF (C.I. Prototype 624), Interchemical Acetate Yellow HDLF–40 (Prototype 625, C.I., 2nd edition, vol. II, No. 10338), Eastone Fast Red N–GLF (Protoype 620, C.I. Disperse Red 35, C.I., 2nd addition, vol. I, p. 1702), Eastman Fast Blue B–GLF (C.I. Disperse Blue 27, C.I., 2nd edition, vol. II, No. 60767), Eastman polyester Red 2G (Technical Manual of the A.A.T.C.C., 1966, vol. 42, p. D–39), Eastman Blue BNN (C.I., 2nd edition, vol. II, No. 61505), Palanil Red 3 BF (C.I. Disperse Red 75, C.I., Supp. 1963, p. S201), Latyl Brilliant Blue BG (C.I. Disperse Blue 60, C.I., Supp. 1963, p. S214), Amacel Scarlet GB (C.I. Disperse Red 1, C.I. No. 11110), or mixtures thereof.

The liquor to filamentary material in the dye bath may vary from about 20:1 to infinity, preferably from about 50:1 to about 100:1, and the dyeing temperature may vary from about 80 degrees to about 100 degrees centigrade.

Cellulose esters of low hydroxyl content, e.g., cellulose triacetate, are often printed rather than dyed. Normally, after printing, the fabric is subjected to pressure steaming for a relatively long period of time, e.g., 1 hour, to fix the color in the fabric. By utilizing the low molecular weight polyvinyl acetate of this invention, printing formulations may be utilized that can take advantage of the additive in the fabric so that atmospherically steamed dye prints can be produced with color yields equivalent to pressure steamed regular prints.

In addition to the above improvements in dyeability and printability, the additive containing filamentary material, preferably after being changed to an annealed or crystallized state, e.g., by a heat treatment, has a safe-ironing temperature equivalent to that of substantially identically prepared and treated material containing no additive, and is preferably equal to that of non-additive containing material. In many cases, the safe-ironing temperature of fabrics is not less than about 210 degrees centigrade and the sticking temperature of films is not less than about 200 degrees centigrade.

The mechanical properties of the material containing a low molecular weight vinyl acetate polymer are only very slightly changed over such properties of a control material, and such change does not affect the utility of the material.

The product of this invention has the same utility as that of the cellulose triacetate of commerce. Thus, the filamentary materials produced in accordance with this invention may be used in apparel, e.g., blouses, skirts, lingerie, and in home furnishings such as drapes, upholstery fabrics and carpeting.

The invention will now be further illustrated by the following examples in which all percentages are by weight and all temperatures are expressed as degrees centigrade unless otherwise indicated.

EXAMPLES

Preparation of low molecular weight PVAc equipment

The reactions were carried out in a 125-gallon stainless steel jacketed reactor equipped with turbine agitation and vertical baffles. The jacket was piped with cooling water and high-pressure steam for temperature control. A nitrogen line went to the reactor for purging and for pressurizing the vessel to discharge the product. A concentric tube heat exchange was connected to the reactor for condensing the isopropyl alcohol, which was collected in a 55-gallon tank. The entire system was piped into the plant vacuum to aid in the alcohol distillation.

Procedure

The reactor was cleaned by boiling xylene followed by an isopropyl alcohol boil to remove scale, oil or foreign matter. The general procedure for each batch was to charge the reactants in the following order: isopropyl alcohol (as the final step in the preparation of the previous batch), vinyl acetate and di-t-butyl peroxide catalyst in a 4:1:0.04 proportion. The reactor was purged with nitrogen and then sealed. Steam was used to initiate the reaction, but one the exotherm had started (arbitrarily set at 107° centigrade), the steam was discontinued. When the batch temperature approached the 138° centigrade hold-point, cooling water was put in the jacket to slow the reaction. The batch was then held at about 138° centigrade for two hours using steam, prior to stripping off the alcohol. At that time, the steam was stopped and the reactor vented. When the temperature fell to about 80° to 90° centigrade, the system was momentarily pressurized with nitrogen to remove the condensed alcohol from the receiving tank which would not contain a full charge. Stripping was then continued under vacuum (up to 28 in. Hg) at a temperature of 80° to 100° centigrade. At this point, the resin was cooled to about 70° centigrade and discharged into a 55-gallon polyethylene-lined drum under a nitrogen blanket. Isopropyl alcohol was charged to the reactor to prevent oxidation of the residual resin.

Batch 1

The batch was charged with 100 lbs. of vinyl acetate. During the reaction state, the exotherm peaked at 140° centigrade and the steam was discontinued and cooling water introduced to hold the batch for 125 minutes at 138° centigrade. The batch was stripped for about 150 minutes, terminated at 95° centigrade and 28.3 inches Hg vacuum. The yield of polyvinyl acetate resin was 109.5 lbs. (110 percent yield).

Batch 2

The batch charge was 105.5 lbs. of vinyl acetate. The exotherm reached 145° centigrade and the batch was held for 140 minutes at 138° centigrade It was stripped for 170 minutes, terminating at 95° centigrade and 28.8 inches of Hg. The yield was 114.5 lbs. (109 percent yield).

Batch 3

The charge of vinyl acetate was increased to 135 lbs. with the other constituents in the previous proportions of Batch 1. The exotherm reached 140° centigrade and the batch was held for 115 minutes. After stripping for 140 minutes, the system was cooled overnight. The following morning, the distillation was continued for another 80 minutes, finishing at 97° centigrade and 26 in. Hg vacuum. The yield was 157 lbs. (116 percent yield).

Batch 4

The vinyl acetate charged was 120 lbs.; all other materials were used in the previous proportions of Batch 1. The exotherm peaked at 140° centigrade and the batch was held at 138° centigrade for 90 minutes, when it was cooled for the night. The following morning the stripping operation was initiated. This operation lasted for 260 minutes and was terminated at 100° centigrade and 27 in. Hg vacuum. The yield was 135.5 lbs (113 percent yield).

A total of 100 pounds of vinyl acetate yielded 109.5 pounds of product. Presumably substantially all the vinyl acetate reacted and the additional weight is due to

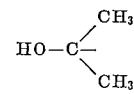

on the left hand end of each molecule. The degree of vinyl acetate polymerization is then about 5.

A summary of the process conditions for each batch is given in Table I.

TABLE I.—SUMMARY OF PROCESSING CONDITIONS FOR PREPARATION OF POLYVINYL ACETATE

| Batch No. | Vinyl acetate charge, lbs. | Max. react. temp., °C. | Duration of 138° C. hold, mins. | Max. stripping cond. | |
|---|---|---|---|---|---|
| | | | | Temp., °C. | Vacuum, in. Hg |
| 1 | 100 | 142 | 125 | 95 | 28.3 |
| 2 | 105.5 | 145 | 140 | 95 | 28.8 |
| 3 | 135 | 142 | 115 | 97 | 26 |
| 4 | 120 | 140 | 90 | 100 | 27 |

Product properties

All resin samples were very nearly water-white by visual examination. Samples of the batches were analyzed for I.V., viscosity and hydroxyl content. The results are given in Table II.

TABLE II.—PROPERTIES OF POLYVINYL ACETATE PREPARED IN BATCHES 1 TO 4

| Batch No. | Weight, lbs. | Yield, percent | Viscosity, poise | I.V. | Hydroxyl content,[1] eq. wt./OH |
|---|---|---|---|---|---|
| 1 | 109.5 | 110 | 480–540 | <0.05 | 1,180 |
| 2 | 114.5 | 109 | 1,030 | 0.03–0.05 | 1,130 |
| 3 | 157.0 | 116 | 1,160 | <0.05 | 1,050 |
| 4 | 135.5 | 113 | 610 | <0.05 | 1,120 |

In each of the examples, the results obtained from various tests carried out on additive-containing yarn are compared with those obtained from the same tests carried out on a substantially identically prepared yarn of the same material which contains no additive.

EXAMPLE I

Cellulose triacetate having an acetyl content of 61.7 percent calculated as combined acetic acid by weight and polyvinyl acetate of Batch No. 2 were dissolved in a solvent consisting of 91 percent methylene chloride and 9 percent methanol, by volume, to yield a clear spinning dope containing 21.9 percent cellulose triacetate and 1.7 percent polyvinyl acetate, based on the weight of the solution. The dope was dry-spun through a spinneret containing 40 holes of 0.036 millimeter diameter, into a spinning cabinet and taken up at a spinning speed of 500 meters per minute to yield a 40 filament yarn of 150 denier containing 8 percent of low molecular weight polyvinyl acetate, based on the weight of the cellulose triacetate. The individual filaments were 3.75 denier. The yarn exhibited a tenacity of 1.15 grams per denier and an elongation of 25.8 percent. The 150/40 yarns were knitted into 3 oz. per sq. yard hoselegs on a 240 needle 3½ in. diameter cylinder of a Labknit-1 knitting machine manufactured by the North Carolina Knitting Machine Company. The fabric was scoured at 70 degrees centigrade for ½ hour in a scour bath containing 2 grams per liter of a surface active agent and 0.5 gram per liter of sodium hexametaphosphate. The scoured sample was then rinsed in distilled water at 23 degrees centigrade and air dried. The fabric was dyed in a standard aqueous dyebath containing Eastman Fast Blue B–GLF (C.I. Disperse Blue 27, C.I., 2nd edit., vol. 2, No. 60767). The dyebath contained 2 percent of dye based on the weight of the fabric (OWF) and the liquor-to-fabric ratio on a weight basis was 40:1.

The dyeing was carried out by agitating the fabric sample with the dyebath in an Atlas Launderometer for 2 hours at 97 degrees centigrade as described in the 1958 edition of the Technical Manual and Yearbook of the American Association of Textile Chemists and Colourists, pages 83 and 84.

After washing and drying the fabric was found to contain about 2.2 percent of dye based on the weight of the fabric, determined by conventional methods of colorimetry after dissolving the dyed sample in an appropriate solvent, e.g., 91 percent methylene chloride and 9 percent methanol.

A control sample was prepared and treated as described previously except that no low molecular weight polyvinyl acetate was incorporated into the spinning dope. The tenacity of the filaments was 1.24 grams per denier and the elongation was 28.8 percent. The dye take-up upon being knit was found to be 0.8 percent OWF.

EXAMPLE II

The procedure of Example I was repeated except that the fabric was dyed in a dyebath containing 4 percent OWF Eastone Red N–GLF (prototype 620, C.I. Disperse Red, C.I., 2nd edit., vol. 1, p. 1702). The dye takeup after two hours was 3.5 percent OWF. When a control sample was dyed in the dyebath of this example, the dye takeup was found to be 2.3 percent OWF.

EXAMPLE III

The procedure of Example I was repeated except that the dyebath contained 4 percent OWF of Eastman Fast Blue B–GLF (C.I. Disperse Blue 27, C.I., 2nd edit., vol. 2, No. 60767). The dye takeup was found to be 3.6 percent OWF. The dye takeup of the control sample was found to be 2.5 percent OWF.

EXAMPLE IV

The procedure of Example I was repeated except that roller print strikeoffs were made on the polyvinyl acetate-containing fabric. The print paste consisted of 3 percent Amacel Scarlet GB (C.I. Disperse Red 1, C.I. No. 11110), 47 percent water and 50 percent Keltex thickener. The printed fabric was steam aged at atmospheric pressure for 20 minutes. The fabric was aftersoaped and rinsed to remove unfixed dyestuff.

A control sample was prepared and treated as described previously except that no low molecular weight polyvinyl acetate was incorporated into the spinning dope. The color yield for the additive-containing fabric was greater than for the control.

Table III shows the lightfastness and washfastness properties of the control compared with the polyvinyl acetate-containing fabric of Example IV, expressed as International Grey Scale Ratings:

TABLE III

| Heatsetting temperature | 10 hr. light | 120° F. wash |
| --- | --- | --- |
| Control: | | |
| 350° F | 2 | 3 |
| 400° F | 2 | 3–4 |
| PVAc containing: | | |
| 350° F | 4 | 4 |
| 400° F | 4 | 3–4 |

EXAMPLE V

A Parr autoclave was charged with 213.8 grams vinyl acetate, 9.32 grams sodium methallyl sulfonate, 375 grams isopropyl alcohol and 4.5 grams di-t-butyl peroxide. The autoclave was sealed and reached 150 degrees centigrade in 35 minutes with a pressure of 170 pounds per square inch. The exotherm dissipated and pressure dropped to 120 pounds per square inch. The reaction was held at 145 degrees centigrade to 155 degrees centigrade for one hour. The reaction mixture was cooled, filtered to remove some insoluble sodium methallyl sulfonate and stripped of alcohol on a rotating evaporator. Polymer conversion was 98.5 percent, the I.V. was 0.05 and the percent sulfur found was 0.78 percent, corresponding to 3.85 percent sodium methallyl sulfonate.

This copolymer was incorporated into a 150/40 cellulose triacetate yarn at a level of 15 weight percent. Satisfactory spinning performance was obtained. The tensile properties of this additive fiber are similar to those of bright 10 percent polyvinyl acetate. The vinyl acetate sodium methallyl sulfonate copolymer additive gives all the deep disperse dyeing properties, whiteness and thermal characteristics of polyvinyl acetate additive cellulose triacetate samples. Actually, the copolymer additive imparts more disperse dyeability to cellulose triacetate fibers than 10 percent polyvinyl acetate. This is due in part to the greater concentration of the copolymer additive, and in part to the greater moisture sensitivity of the copolymer additive fiber compared to 10 percent polyvinyl additive fibers. The polyvinyl acetate/sodium methallyl sulfonate dyeable deep dye cellulose triacetate fibers can be heat treated at 210 degrees centigrade for 2 minutes without any adverse color effects.

The increased dye takeup obtained by means of the process and product of this invention has no significant effect on the various properties of the dyed product. The dyed products have satisfactory washfastness, dry-cleaning fastness, perspiration fastness, whiteness, response to bleaching and abrasion resistance when compared to the control samples.

Table IV shows the dye uptake analysis on banded hoseleg samples obtained in dyeing rate studies made in separate baths.

TABLE IV

Dye uptake analyses on banded hoseleg samples 2% (OWF) competitive dyeings 2 hr. at 97° C. (40:1 LR)

| | Percent Eastman Fast Blue B–GLF [1] |
| --- | --- |
| Hoseleg Sample No. 1: | |
| CTA Control | 0.8 |
| 7.5 PVAc | 1.6 |
| 10% PVAc | 2.2 |
| 12.5% PVAc | 2.4 |
| 15% PVAc | 2.6 |
| Hoseleg Sample No. 2: | |
| CTA Control | 1.2 |
| 10% PVAc | 2.8 |
| Hoseleg Sample No. 3: | |
| CTA Control | 0.9 |
| 10% PVAc | 2.3 |
| Hoseleg Sample No. 4: | |
| CTA Control | 0.9 |
| 10% PVAc | 2.0 |

[1] C.I. Dispersed Blue 27, C.I. No. 60767.

Table V shows the disperse dye capacities (dye uptake in 24 hours microdyeing at 97 degrees centigrade) for low molecular weight polyvinyl acetate additive yarns. The increase in dye capacity imparted by the addition of the polyvinyl acetate resin leads to the "deep dye effect."

TABLE V

[Disperse dye capacity of deep dye triacetate yarns (24 hr. microdyeing 97° C.)]

| | Percent dye uptake | |
|---|---|---|
| | Eastone Fast Red N-GLF, C.I. Disperse Red 35, C.I. Prototype 620 | Eastman Fast Blue B-GLF, C.I. Disperse Blue 27, C.I. No. 60767 |
| Control CTA | 4.1 | 10.0 |
| Containing PVAc (low mol. wt., I.V. <0.05) percent: | | |
| 10 | 5.5 | 14.5 |
| 12.5 | 5.3 | 16.1 |
| 15 | 5.4 | 16.1 |

Table VI shows the lightfastness properties of pastel disperse dye shades on cellulose triacetate containing about 10 percent low molecular weight polyvinyl acetate.

TABLE VI

[Lightfastness of selected disperse dyes (pastel shades) on PVAc deep dye triacetates (low mol. wt. resin)]

| | International Grey Scale ratings | | | |
|---|---|---|---|---|
| | Dyed-only | | Dyed-heat treated [1] | |
| Hoseleg samples | 20 hr. | 40 hr. | 20 hr. | 40 hr. |
| Dull CTA Control: | | | | |
| 0.15% (OWF) Eastman Fast Blue B-GLF [2] | 4-5 | 4-5 | 4+ | 4 |
| 0.15% (OWF) Palanil Red 3BF [3] | 4 | 4 | 4-5 | 4 |
| 0.15% (OWF) Latyl Brill. Blue B G [4] | 4 | 4 | 4-5 | 4 |
| Light Tertiary Tan Shade | 4-5 | 4 | 4-5 | 4 |
| Dull CTA with 10% PVAc: | | | | |
| 0.15% (OWF) Eastman Fast Blue B-GLF | 4-5 | 4 | 4 | 3-4 |
| 0.15% (OWF) Palanil Red 3BF | 4-5 | 4+ | 4 | 3 |
| 0.15% (OWF) Latyl Brill. Blue B G | 4 | 3-4 | 4-5 | 4 |
| Light Tertiary Tan Shade | 4-5 | 4-5 | 4+ | 4 |

[1] 2 minutes at 215° C.
[2] Disperse Blue 27, C.I., 2d edit., vol. II, No. 60767.
[3] C.I. Disperse Red 75, C.I., Supp. 1963, p. S201.
[4] C.I. Disperse Blue 60, C.I., Supp. 1963, p. S214.

The test used to obtain the results in Table V is the Standard Test Method 16A–1964, which is described in the Technical Manual and Yearbook of the American Association of Textile Chemists and Colourists for the Year 1964. The carbon arc lamp exposure time was 20 standard hours. After exposure the samples were rated for change in accordance with the International Grey Scale:

5—no change
4—slight change
3—moderate change
2—marked change
1—severe change

The improved dye takeup does not result in any significant difference in the mechanical properties of the shaped article when compared with the control.

Applicant's invention is not limited to filamentary materials as the shaped articles, but is also applicable to other shaped articles such as film. This is shown by the following example:

EXAMPLE VI

A casting solution was prepared dissolving 18 percent based on the weight of the solution of the cellulose triacetate described in Example I and 2 percent by weight of the solution of low molecular weight polyvinyl acetate having an inherent viscosity of less than 0.05. The solution was cast on a cool glass plate to form a film. A 2 inch by 2 inch sample of the film was first dyed by boiling for 1 hour in a dye solution containing Eastman Fast Blue B-GLF (C.I. Disperse Blue 27, No. 60767). The dyed film was thoroughly washed in warm water and blotted between paper towels before drying at 60 degrees centigrade. The dyed film was found by standard colorimetry to contain 4.50 percent OWF Dye. As a control, the procedure of Example I was repeated except that the casting solution contained 20 percent cellulose triacetate and no low molecular weight polyvinyl acetate. The dyed film was found to contain 1.00 percent OWF dye.

The embodiments of the invention in which an exclusive property or privilege is claimed are defined as follows:

1. A shaped article comprising a major proportion of a cellulose ester of a lower aliphatic carboxylic acid, containing fewer than about 0.29 free hydroxy groups per anhydroglucose unit in the cellulose molecule and containing throughout its cross-section and physically mixed with said cellulose ester a minor proportion of a preformed vinyl acetate polymer having an inherent viscosity in acetone at 25° C. and 0.1% concentration of from about 0.03 to about 0.10.

2. The product of claim 1, wherein said cellulose ester is cellulose triacetate.

3. The product of claim 2, wherein said shaped article comprises from about 51 percent to about 99 percent cellulose triacetate and from about 1 percent to about 49 percent vinyl acetate polymer.

4. The product of claim 2, wherein said shaped article comprises from about 80 percent to about 95 percent cellulose triacetate and from about 5 percent to about 20 percent vinyl acetate polymer.

5. The product of claim 2, wherein said shaped article comprises from about 90 percent to about 93 percent cellulose triacetate and from about 7 percent to about 10 percent vinyl acetate polymer.

6. The product of claim 2, wherein said shaped article is a filamentary material.

7. The product of claim 6, wherein said vinyl acetate polymer is a homopolymer of vinyl acetate having an inherent viscosity of from about 0.03 to about 0.05.

8. The product of claim 7, dyed with a disperse dye.

9. A process comprising dissolving from about 51 percent to about 99 percent of a cellulose ester of a lower aliphatic carboxylic acid, containing fewer than about 0.29 free hydroxyl groups per anhydroglucose unit in the cellulose molecule, and from about 1 percent to about 49 percent of a preformed vinyl acetate polymer having an inherent viscosity in acetone at 25° C. and 0.1 percent concentration of from about 0.03 to about 0.10, in a solvent to form a solution of from about 15 percent to about 25 percent solids, and extruding said solution into an evaporative atmosphere for said solvent to form a shaped article, evaporatively removing said solvent and collecting said shaped article comprising said cellulose ester with said preformed low molecular weight vinyl acetate polymer distributed throughout the cross-section of said shaped article and in physical mixture with said cellulose ester.

10. The process of claim 9, wherein the solvent is selected from the group consisting of dimethylformamide, dimethylacetamide and a methylene chloride/methanol mixture.

11. The process of claim 10, wherein said cellulose ester is cellulose triacetate.

12. The process of claim 11, wherein said shaped article is a filamentary material.

13. The process of claim 12, wherein said vinyl acetate polymer is a homopolymer of vinyl acetate.

14. The process of claim 13, wherein said homopolymer of vinyl acetate has been polymerized at superatmospheric pressure and in the presence of an alkanol containing from 1 to 4 carbon atoms.

15. The process of claim 14, wherein said alkanol is isopropyl alcohol.

References Cited

UNITED STATES PATENTS

| | | | |
|---|---|---|---|
| 2,402,942 | 7/1946 | Bludworth | 260—17X |
| 2,892,672 | 6/1959 | Conciatori | 260—17X |
| 3,277,032 | 10/1966 | Caldwell | 260—17 |
| 3,454,349 | 7/1969 | Smart | 260—17X |

WILLIAM H. SHORT, Primary Examiner

L. M. PHYNES, Assistant Examiner

U.S. Cl. X.R.

8—57; 260—17; 264—78, 176, 187, 207